UNITED STATES PATENT OFFICE 2,055,169

WATER-INSOLUBLE AZO-DYESTUFFS

Gérald Bonhôte and Jakob Danuser, Basel, Switzerland, assignors to the firm Society of Chemical Industry in Basle, Basel, Switzerland No Drawing. Application January 17, 1935, Serial No. 2,302. In Switzerland October 13, 1934

8 Claims. (Cl. 260—81)

It has been found that new and valuable azo-dyestuffs insoluble in water are obtained by causing diazo-compounds of the general formula $$HO-N=N-R_1-N=N-R_2$$

in which $R_1$ and $R_2$ represent aromatic nuclei of the benzene or naphthalene series, and in which at least one of the two nuclei $R_1$ and $R_2$ is substituted by an alkoxy-group in ortho-position to the —N=N-group, to react with 3-hydroxy-7,2-benzofluorenone of the general formula

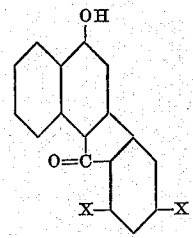

in which one X represents hydrogen and the other X halogen or hydrogen. Particularly valuable results are obtained with products having such alkoxy groups which contain themselves not more than two carbon atoms.

The dyestuffs obtainable according to this new process correspond to the general formula

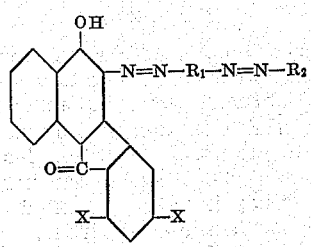

wherein $R_1$ and $R_2$ represent aromatic radicals of the benzene or naphthalene series of which at least one bears an alkoxy group in ortho-position to the —N=N-group, one X stands for hydrogen and the other X for hydrogen or halogen. These dyestuffs are dark powders soluble in pyridine to olive-green to dark-green solutions, and in sulfuric acid to blue-violet to blue-green and blue-black solutions, and which, when produced on the fiber, dye the same tints which are very fast, particularly surprisingly fast to light, and are split by treatment with reducing agents, on the one hand, into a compound of the probable general formula

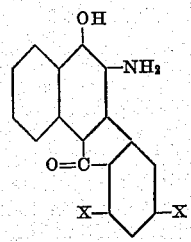

wherein the two letters X have the signification indicated above, which product is soluble in alkalies to a violet solution, and, on the other hand, into a mixture consisting of an unsulfonated primary amine and an unsulfonated primary aromatic diamine.

The following examples illustrate the invention, without, however, limiting the same:—

Example 1

27.6 parts by weight of 4'-chloro-4-amino-3-methoxy-6-methyl-azobenzene are diazotized as usual and the diazo-solution is introduced into one of 24.6 parts by weight of 3-hydroxy-1,2-benzofluorenone, 50 parts of caustic soda solution of 30 per cent. strength, and 30 parts of calcined sodium carbonate in 2000 parts of water. The dyestuff is precipitated immediately; the black precipitate is filtered and dried. It corresponds very probably with the formula

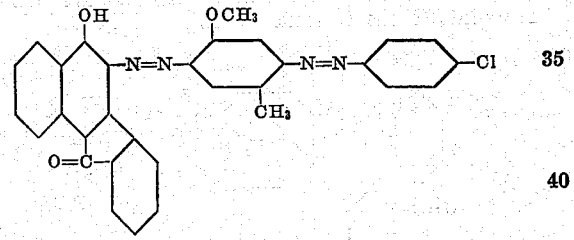

and dyes cotton, when produced on this fiber, deep greenish-black tints.

It forms a black powder soluble in pyridine to an olive-green and in sulfuric acid to a blue-green solution and by reduction yields 1,4-diamino-2-methyl-5-methoxybenzene, 4-chloro-1-aminobenzene and a product soluble in a sodium hydroxide solution with a violet coloration which product corresponds very probably with the formula

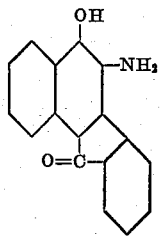

A similar result is attained with the 4'-chloro-4-amino-3-ethoxy-6-methyl-azobenzene or the 4'-bromo-2-amino-3-methoxy-6-methyl-azobenzene.

Similar dyestuffs are also obtained when using the 3-propyloxy or the 3-butyloxy-compound instead of 4'-chloro-4-amino-3-methoxy- or 3-ethoxy-azobenzene. Alkoxyalkoxy radicals may also be used, such as O—$CH_2$—$CH_2$—O—$CH_3$ or O—$CH_2$—$CH_2$—O—$CH_2$—$CH_3$.

Similar dyestuffs are formed when using 3-hydroxy-6-chloro - 1,2 - benzofluorenone or 3-hydroxy-8-chloro-1,2-benzofluorenone instead of 3-hydroxy-1,2-benzofluorenone.

*Example 2*

Cotton yarn is impregnated with a grounding made by dissolving 10 grams of 3-hydroxy-1,2-benzofluorenone in 300 cc. of hot water with addition of 18 cc. of a sodium hydroxide solution of 30 per cent. strength and 10 cc. of Turkey red oil, and diluting the whole to one liter with addition of 15 grams of common salt. The yarn is then wrung out and developed in a diazo-solution neutralized with sodium acetate corresponding to a content of 3 grams of diazotized 4-amino-2-methyl-5-methoxy-4'-chloro-1,1'-azobenzene per liter. There is produced a full black of very good fastness properties.

*Example 3*

Cotton yarn is impregnated with a grounding made by dissolving 10 grams of 3-hydroxy-1,2-benzofluorenone in 300 cc. of hot water with addition of 18 cc. of a sodium hydroxide solution of 30 per cent. strength and 10 cc. of Turkey red oil, and diluting the whole to one liter with addition of 15 grams of common salt. The yarn is then wrung out and developed in a diazo-solution neutralized with sodium acetate corresponding to a content of 3 grams of 4-diazonaphthalene-1,1'-azo-2'-ethoxybenzene per liter. There is produced a full black of very good fastness properties. The new dyestuff very probably corresponds to the formula

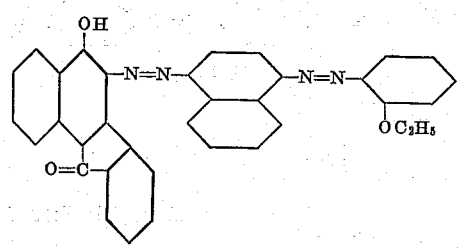

It forms a black powder soluble in pyridine to an olive-green and in sulfuric acid to a blue-green solution and by reduction yields 1,4-diamino-naphthalene, 2-ethoxy- 1 -aminobenzene and a product soluble in a sodium hydroxide solution with a violet coloration which product corresponds very probably with the formula

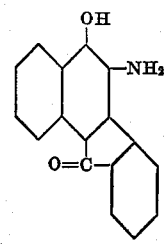

A similar black tint is obtained with the 4-diazo-naphthalene - 1,1' - azo-2'-methoxybenzene. The dyestuffs prepared with these diazo-compounds correspond very probably with the general formula

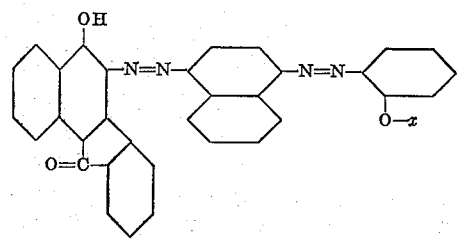

in which $x$ stands for ethyl or methyl. They form black powders, soluble in pyridine to an olive-green and in sulfuric acid to a blue-black solution and by reduction yield 1,4-diamino-naphthalene, 1-amino-2-ethoxy or methoxy-benzene and a product soluble in a sodium hydroxide solution with a violent coloration, which product corresponds very probably with the formula

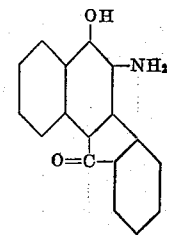

The dyestuffs of the present example can also be produced in the form of pigments as described in Example 1. Similar dyestuffs are also formed here if the diazotizing component contains a higher alkyl radical, or if there are used 3-hydroxy-6-chloro- or 3-hydroxy-8-chloro-1,2-benzofluorenone instead of 3-hydroxy-1,2-benzofluorenone.

*Example 4*

The material to be printed is foularded with an alkaline solution containing per liter 16 grams of 3-hydroxy-6-chloro-1,2-benzofluorenone. When dry, the material is treated with a printing color containing 16 grams of diazotized 4-amino-2,5-diethoxy-3'-methyl-1,1'-azobenzene per kilogram. The pure black dyeing develops rapidly and possesses very good fastness properties.

The new dyestuff very probably corresponds with the formula

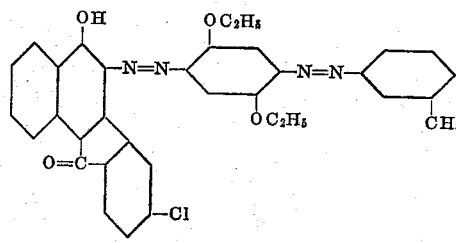

It forms a black powder soluble in pyridine to a green and in sulfuric acid to a blue-violet solution and by reduction yields 1,4-diamino-2,5-diethoxybenzene, 1-amino-3-methylbenzene and a product soluble in a sodium hydroxide solution with a violet coloration which product corresponds probably with the formula

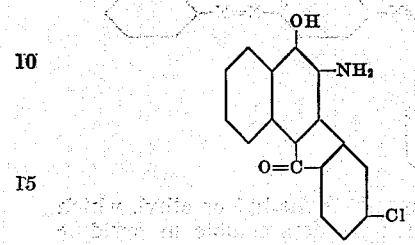

The dyestuffs of the preceding examples can also be produced on the fiber according to the data of this example.

What we claim is:—

1. The dyestuffs of the general formula

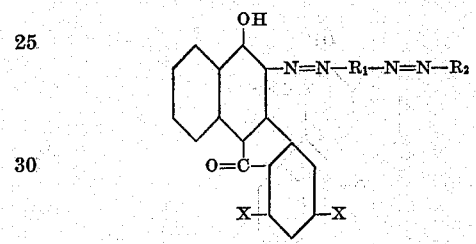

wherein R₁ and R₂ represent aromatic radicals of the benzene or naphthalene series of which at least one bears an alkoxy group in ortho-position to the —N=N— group, one X stands for hydrogen and the other X for hydrogen or halogen, which dyestuffs are dark powders soluble in pyridine to olive-green to dark-green solutions, and in sulfuric acid to blue-violet to blue-green and blue-black solutions, and which dyestuffs, when produced on the fiber, dye the same tints which are very fast, particularly surprisingly fast to light, and are split by treatment with reducing agents, on the one hand, into a compound of the probable general formula

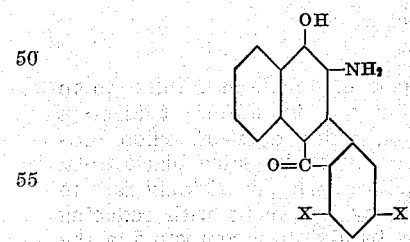

wherein the two letters X have the signification indicated above, which product is soluble in alkalies to a violet solution, and, on the other hand, into a mixture consisting of an unsulfonated primary amine and an unsulfonated primary aromatic diamine.

2. The dyestuffs of the general formula

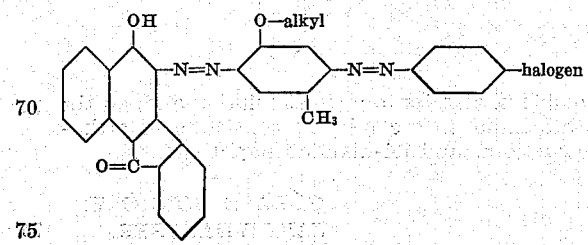

which are black powders soluble in pyridine to olive-green solutions and in sulfuric acid to blue-green solutions, which dyestuffs, when produced on the fiber, dye the same black tints which are fast, particularly surprisingly fast to light, and are split by treatment with reducing agents, on the one hand, into a compound of the probable formula

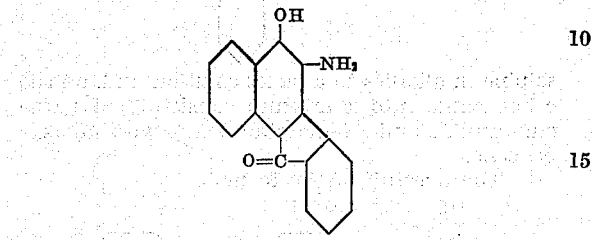

soluble in alkalies to a violet solution and, on the other hand, into a mixture consisting of para-halogen-aniline and 1,4-diamino-2-methyl-5-alkoxybenzene.

3. The dyestuffs of the general formula

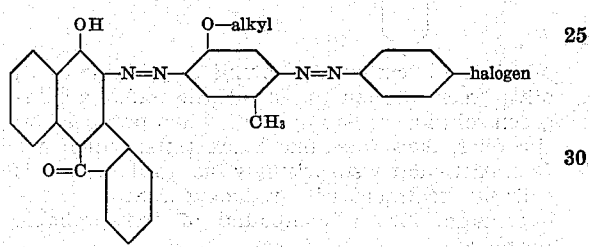

wherein alkyl represents methyl or ethyl, which dyestuffs are black powders soluble in pyridine to olive-green solutions and in sulfuric acid to blue-green solutions, and, when produced on the fiber, dye the same black tints which are fast, particularly surprisingly fast to light, and are split by treatment with reducing agents, on the one hand, into a compound of the probable formula

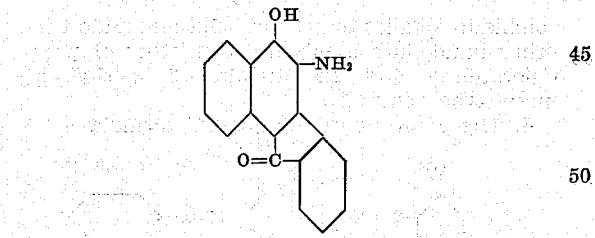

soluble in alkalies to a violet solution and, on the other hand, into a mixture consisting of para-halogen-aniline and 1,4-diamino-2-methyl-5-alkoxybenzene.

4. The dyestuffs of the general formula

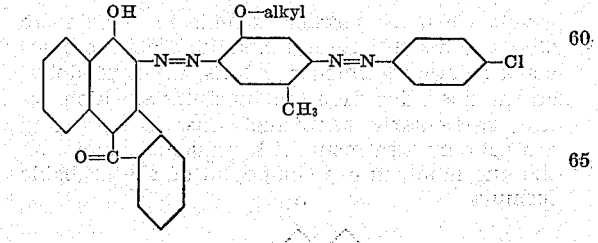

wherein alkyl represents methyl or ethyl, which dyestuffs are black powders soluble in pyridine to olive-green solutions and in sulfuric acid to blue-green solutions, and, when produced on the fiber, dye the same black tints which are fast, particularly surprisingly fast to light, and are split by treatment with reducing agents, on the one hand, into a compound of the probable formula

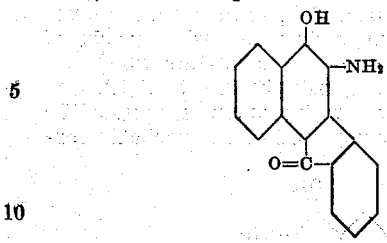

soluble in alkalies to a violet solution and, on the other hand, into a mixture consisting of parachloraniline and 1,4-diamino-2-methyl-5-alkoxybenzene.

5. The dyestuff of the formula

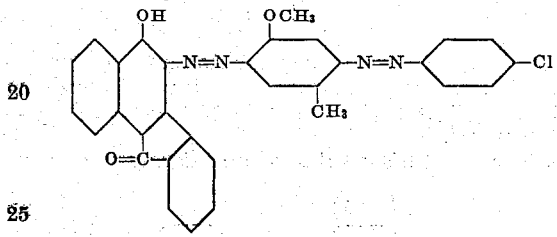

which is a black powder soluble in pyridine to an olive-green solution and in sulfuric acid to a blue-green solution, which dyestuff, when produced on the fiber, dyes the same black tints, which are fast, particularly surprisingly fast to light, and is split by treatment with reducing agents, on the one hand, into a compound of the probable formula

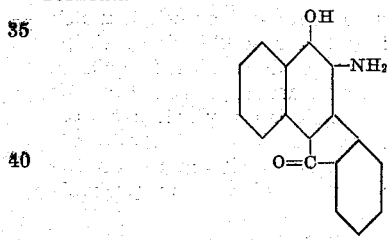

soluble in alkalies to a violet solution and, on the other hand, into a mixture consisting of parachloraniline and 1,4 - diamino - 2 - methyl - 5 - methoxybenzene.

6. The dyestuffs of the general formula

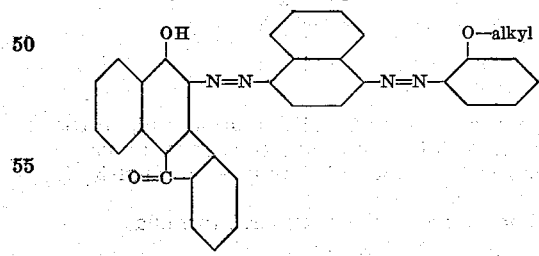

which are black powders soluble in pyridine to olive-green solutions and in sulfuric acid to blue-black solutions, which dyestuffs, when produced on the fiber, dye the same black tints, which are fast, particularly surprisingly fast to light, and are split by treatment with reducing agents, on the one hand, into a compound of the probable formula

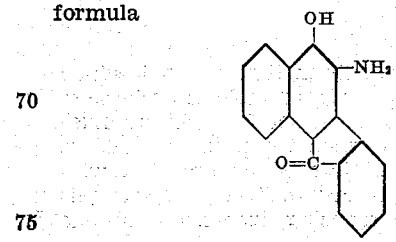

soluble in alkalies to a violet solution and, on the other hand, into a mixture consisting of 1-amino-2-alkoxybenzene and 1,4-diamino-naphthalene.

7. The dyestuffs of the general formula

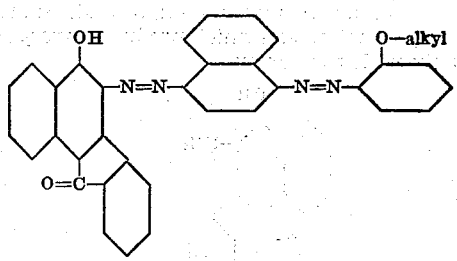

wherein alkyl represents methyl or ethyl, which dyestuffs are black powders soluble in pyridine to olive-green solutions and in sulfuric acid to blue-black solutions, and, when produced on the fiber, dye the same black tints, which are fast, particularly surprisingly fast to light, and are split by treatment with reducing agents, on the one hand, into a compound of the probable formula

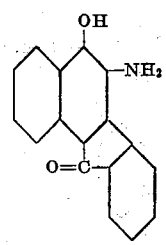

soluble in alkalies to a violet solution and, on the other hand, into a mixture consisting of 1-amino-2-alkoxybenzene and 1,4-diamino-naphthalene.

8. The dyestuff of the formula

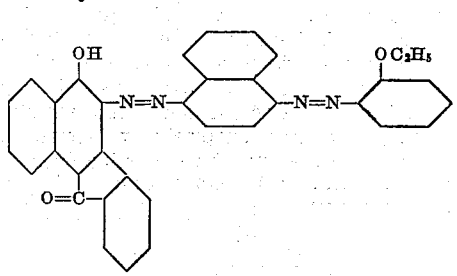

which is a black powder soluble in pyridine to an olive-green solution and in sulfuric acid to a blue-black solution, which dyestuff, when produced on the fiber, dyes the same black tints, which are fast, particularly surprisingly fast to light, and is split by treatment with reducing agents, on the one hand, into a compound of the probable formula

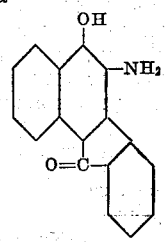

soluble in alkalies to a violet solution and, on the other hand, into a mixture consisting of orthophenetidine and 1,4-diamino-naphthalene.

GÉRALD BONHÔTE.
JAKOB DANUSER.